(12) United States Patent
Yamada et al.

(10) Patent No.: US 6,277,209 B1
(45) Date of Patent: Aug. 21, 2001

(54) METHOD AND APPARATUS OF REGENERATING FILTRATION MEMBRANE CARTRIDGE FOR ACTIVATED SLUDGE

(75) Inventors: Yutaka Yamada; Kiyoshi Izumi; Yoshio Nigara; Kenji Kubota, all of Osaka (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 09/273,008

(22) Filed: Mar. 19, 1999

(30) Foreign Application Priority Data

Apr. 21, 1998 (JP) .................................................. 10-109992

(51) Int. Cl.$^7$ .................................................. B01D 65/02
(52) U.S. Cl. .................................... 134/28; 134/2; 134/3; 134/26; 134/29; 134/41; 134/76; 210/636; 210/791; 210/321.69
(58) Field of Search .................................. 134/26, 76, 28, 134/29, 2, 3, 41; 210/636, 791, 321.69

(56) References Cited

U.S. PATENT DOCUMENTS 3,700,591   10/1972  Higley ............................... 134/22.19
5,647,988   7/1997   Kawanishi et al. .................. 210/636

FOREIGN PATENT DOCUMENTS

| 55-129107 | 10/1980 | (JP) . |
| 58-180203 | 10/1983 | (JP) . |
| 2-063529  | 3/1990  | (JP) . |
| 8-290045  | 11/1996 | (JP) . |
| WO9638220 | 5/1996  | (WO) . |
| WO9718887 | 5/1997  | (WO) . |

*Primary Examiner*—Linda Gray
(74) *Attorney, Agent, or Firm*—Tung & Associates

(57) ABSTRACT

In cleaning by sodium hypochlorite, filtration membrane cartridges are immersed in a washing tank storing a solution of sodium hypochlorite to decompose and remove organic contaminants clogging the pores of filtration membranes by oxidation of sodium hypochlorite; in rinsing with water, the cartridges are immersed in a washing tank storing a rinsing water to wash away the sodium hypochlorite attached to the filtration membrane by the rinsing water; in cleaning by oxalic acid, the cartridges are immersed in a washing tank storing oxalic acid to wash away ferrous substances attached to the filtration membrane by oxalic acid; and in giving hydrophilic property by a hydrophilic agent, the cartridges are immersed in a washing tank storing a solution of the hydrophilic agent so as to apply the hydrophilic agent to the filtration membranes in preparation for dry lay-up.

4 Claims, 15 Drawing Sheets

METHOD AND APPARATUS OF REGENERATING FILTRATION MEMBRANE CARTRIDGE FOR ACTIVATED SLUDGE

FIELD OF THE INVENTION

The present invention relates to techniques for regenerating filtration membrane cartridges used in solid-liquid separators for high-concentration activated sludge and, in particular, to method and apparatus of regenerating filtration membrane cartridges for activated sludge with which filtration membrane cartridges employing filtration membranes composed of an organic flat membrane are readily regenerated at low cost.

BACKGROUND OF THE INVENTION

In activated sludge treatment facilities to perform solid-liquid separation of high-concentration activated sludge, an air diffuser disposed in a tank blows out aeration air to supply oxygen to activated sludge in the tank and the organic matter and nitrogen in raw water is treated with the activated sludge, and a mixed liquor in the tank, which is a mixture of water treated and the activated sludge, is subjected to solid-liquid separation by a membrane separator immersed in an aeration tank.

The above membrane separator has a plurality of filtration membrane cartridges and filters a mixed liquid by using a head within the tank as a driving pressure. The air diffuser is disposed beneath the membrane separator and blows out aeration air upwardly. Updraft caused by air lift action of the bubbles of the aeration air flows along the membrane surfaces of filtration membrane cartridges to clean these membrane surfaces. This cleaning suppresses a reduction in the separation function of the filtration membrane cartridges, thereby preventing the membrane separator from resulting in malfunction.

In the above filtration membrane cartridge, a filtration membrane composed of an organic flat membrane, such as ultrafiltration membrane or microfiltration membrane, is provided on the surface of a filter plate and the periphery of the filtration membrane is secured to the filter plate by welding. Its lifetime is generally between two and five years. When this filtration membrane cartridge is put into service, however, its periphery is flapped by updraft to deteriorate the strength of a welded part, which may result in a shorter lifetime than the normal lifetime as described. On the other hand, filtration membranes used in the filtration membrane cartridges are prepared by coating an organic macromolecular membrane material on both sides of a non-woven fabric serving as a substrate. Since such filtration membranes have durability, little or no breakage takes place, however, contamination due to activated sludge progresses with age, leading to a reduction in flux.

Accordingly, it is a primary object of the invention to provide method and apparatus of regenerating filtration membrane cartridges for activated sludge which effect recovery of the filtration function of contaminated filtration membrane cartridges, remedy of broken parts, and replacement of filtration membranes, with ease and at low cost.

DISCLOSURE OF THE INVENTION

A method of regenerating a filtration membrane cartridge for activated sludge according to the invention, the filtration membrane cartridge being used in solid-liquid separation for activated sludge and prepared by covering the surface of a filter plate with a filtration membrane made of an organic flat membrane, comprises subjecting the filtration membrane cartridge to the steps in the order named: cleaning with sodium hypochlorite; rinsing with water; cleaning with oxalic acid; and giving hydrophilic property with a hydrophilic agent.

In the step of cleaning with sodium hypochlorite, the filtration membrane cartridge is immersed in a washing tank storing a solution of sodium hypochlorite, to decompose and remove organic contaminants clogging the pores of the filtration membrane by oxidation of the sodium hypochlorite.

In the step of rinsing with water, the filtration cartridge is immersed in a washing tank storing a rinsing water, to wash away the sodium hypochlorite attached to the filtration membrane with the rinsing water. This prevents sodium hypochlorite and oxalic acid from reacting with each other to evolve chlorine gas.

In the step of cleaning with oxalic acid, the filtration membrane cartridge is immersed in a washing tank storing a solution of oxalic acid, to clean and remove the ferrous substances attached to the filtration membrane with the oxalic acid.

In the step of giving hydrophilic property with a hydrophilic agent, the filtration membrane cartridge is immersed in a washing tank storing a solution of saccharide, as an example of hydrophilic agents, thereby applying the hydrophilic agent to the filtration membrane in preparation for dry lay-up.

According to one preferred embodiment, the filtration membrane cartridge is subjected to washing with water or a hydrophilic agent prior to the step of washing with sodium hypochlorite. That is, the filtration membrane cartridge is immersed in a washing tank storing a solution of water or a hydrophilic agent, to clean and remove the activated sludge attached to the filtration membrane with the water or hydrophilic agent.

According to other preferred embodiment, the filtration membrane cartridge is subjected to washing with sodium hypochlorite, followed by washing with caustic soda. When the filtration membrane cartridges is used in a drainage containing a considerable amount of aluminum composition, they are immersed in a washing tank storing a solution of caustic soda, to decompose and remove a difficultly soluble alumina attached to the external surface and pores of the filtration membrane by the caustic soda.

According to other preferred embodiment, the filtration membrane cartridge is subjected to washing with oxalic acid, followed by washing with hydrochloric acid. When Ca composition in drainage is attached to the filtration membrane cartridge in the form of a difficultly soluble $CaCo_3$, the filtration membrane cartridge is immersed in a washing tank storing a solution of hydrochloric acid, to decompose and remove the $CaCo_3$ attached to the filtration membrane by the hydrochloric acid.

A method of regenerating filtration membrane cartridge for activated sludge according to the invention, the filtration membrane cartridge having a filtration membrane of an organic flat membrane which is disposed so as to cover the surface of a filter plate made of a resin, a welded part serving to seal which is formed along the periphery of the filtration membrane by securing the filtration membrane to the filter plate by welding with ultrasonic wave, and a region surrounded by the welded part which is defined as an effective filtration region, comprises the step of applying an adhesive agent to the periphery of the filtration membrane along the welded part, such as to bond the periphery of the filtration membrane to the filter plate by the adhesive agent.

This method is effective for the case where the damage to the filtration membrane cartridge is due to deterioration in the sealing property of the welded part which is caused by the filtration membrane coming off from the filter plate at a portion of the welded part. The presence of a bonding part between the filtration membrane and the filter plate, which is formed on both sides of the welded part by an adhesive agent, permits to remedy the sealing property in the periphery of the filtration membrane.

According to one preferred embodiment, an organic reinforcing filtration membrane of strip form is disposed along a welded part between a filtration membrane and a filter plate so as to cover the periphery of the filtration membrane, and an adhesive agent is applied to the reinforcing filtration membrane, whereby the filtration membrane and the reinforcing filtration membrane are integrally bonded to the filter plate by the adhesive agent.

This method is effective for the case where the damage to the filtration membrane cartridge is due to deterioration in the sealing property of the welded part which is caused by the filtration membrane being broken at a portion of the welded part. That is, the sealing property is remedied in such a manner that a reinforcing filtration membrane is secured by adhesive agent so as to cover the broken portion of the filtration membrane.

According to one preferred embodiment, a wet hardening soft adhesive agent is used as an adhesive agent.

A method of regenerating filtration membrane cartridge for activated sludge according to the invention, the filtration membrane cartridge having a filtration membrane of an organic flat membrane which is disposed so as to cover the surface of a filter plate made of a resin, a welded part serving to seal which is formed along the periphery of the filtration membrane by securing the filtration membrane to the filter plate by welding with ultrasonic wave, and a region surrounded by the welded part which is defined as an effective filtration region, comprises the steps of: cutting the filtration membrane along the inside of the welded part such that the filtration membrane is left in a predetermined width including the welded part, as a bonding allowance, along the periphery of the filter plate; disposing a fresh filtration membrane such that its periphery overlaps with the bonding allowance; and applying a wet hardening soft adhesive agent to the fresh filtration membrane along the bonding allowance, to seal the entire periphery of the used and fresh filtration membranes by a layer of adhesive agent which is formed by permeation of the adhesive agent through both membranes and its solidification in the bonding allowance.

This method is effective for the case where the damage to the filtration membrane cartridge is due to the filtration membrane being partially broken in the effective filtration region or due to replacement of the filtration membrane. That is, the fresh filtration membrane is not directly bonded to the filter plate by an adhesive agent but is secured to the filter plate via the used filtration membrane by utilizing the used filtration membrane as an adhesive application surface.

With this arrangement, the welded part ensures the sealing property between the filter plate and the used filtration membrane, and the layer of adhesive agent ensures the sealing property between the used and new filtration membranes, thereby the effective filtration region in the new filtration membrane is sealed against the exterior by the welded part and the layer of adhesive agent.

An apparatus of regenerating a filtration membrane cartridge for activated sludge according to the invention comprises: a plurality of washing tanks, each of which encases a plurality of plate-like filtration membrane cartridges at predetermined spaced intervals; a plurality of cleaning liquid tanks storing different cleaning liquids; a cleaning-liquid supply piping system in communication with each cleaning liquid tank through a liquid supply stop valve and in communication with each washing tank through an inflow stop valve; a cleaning-liquid discharge piping system in communication with each washing tank through a discharge stop valve; and a cleaning-liquid transfer piping system, one end of which is in communication with the cleaning-liquid discharge piping system and the other end is in communication with each washing tank through a circulation stop valve.

In this arrangement, after checking the degree of contamination and kind of contaminant with respect to each filtration membrane of the filtration membrane cartridges, a plurality of filtration membrane cartridges are collectively put in a single washing tank in spaced relation to each other. In this state, there is selected optimum cleaning liquid to remove the contaminant of the filtration membrane cartridges stored in the washing tank, and the liquid supply stop valve of the cleaning liquid tank storing the optimum cleaning liquid and the inflow stop valve of a washing tank to which the cleaning liquid will be supplied are opened to introduce an adequate amount of the cleaning liquid to the latter washing tank through the cleaning-liquid supply piping system, followed by cleaning.

The above cleaning liquid retains ability to clean upon termination of cleaning, and therefore, it is reused for another washing tank. To this end, the discharge stop valve of the former washing tank is opened and the circulation stop valve of the latter washing tank is opened such that the cleaning liquid is introduced into the latter washing tank through the cleaning-liquid discharge piping system and cleaning-liquid transfer piping system.

BRIEF DESCRIPTION OF THE ATTACHED DRAWINGS

EMBODIMENTS

Figure 1:
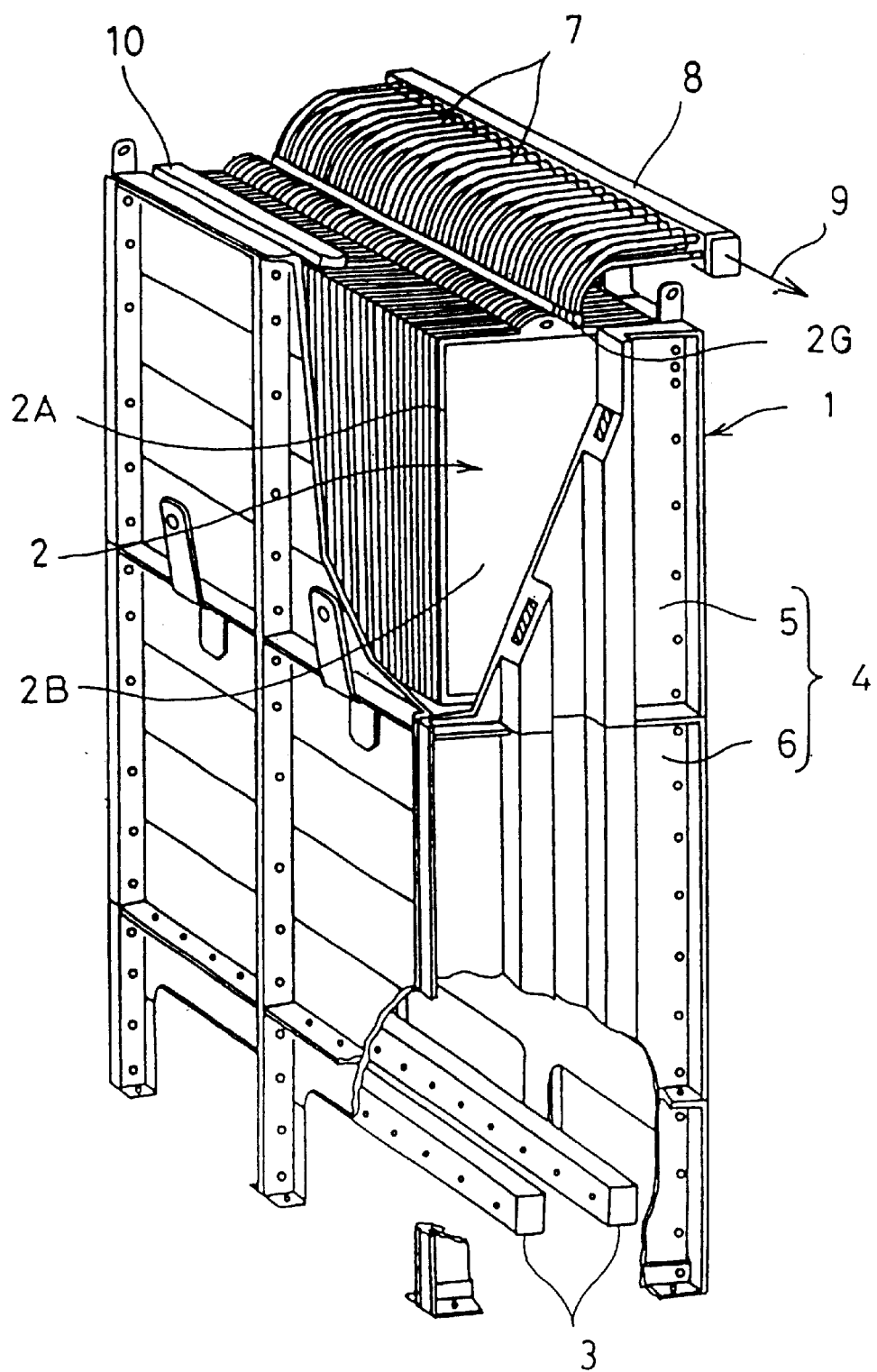
FIG. 1 is a perspective view showing the arrangement of a membrane separator employing filtration membrane cartridges for activated sludge according to one preferred embodiment of the invention.

Preferred embodiments of the invention will be described by referring to the drawings.

First Preferred Embodiment

FIG. 1 is a perspective view of a membrane separator which functions as a solid-liquid separator for high-concentration activated sludge. In FIG. 1, a membrane separator 1 comprises a plurality of plate-like filtration membrane cartridges for activated sludge (hereinafter referred to as a filtration membrane cartridge) 2, an air diffuser 3 by which air for cleaning membrane surface is blown out from a lower part of the membrane separator 1, and a casing 4 for encasing the filtration membrane cartridges 2 and air diffuser 3.

To facilitate conveyance and maintenance, the casing 4 is formed in two parts, i.e., a membrane casing 5 in which a plurality of filtration membrane cartridges 2 in parallel arrangement are held in vertical direction, and a diffuser casing 6 for encasing the air diffuser 3. By the diffuser casing 6, the entire quantity of air for cleaning membrane surface which is blown out of the air diffuser 3 is introduced into the membrane casing 5.

Figure 2:
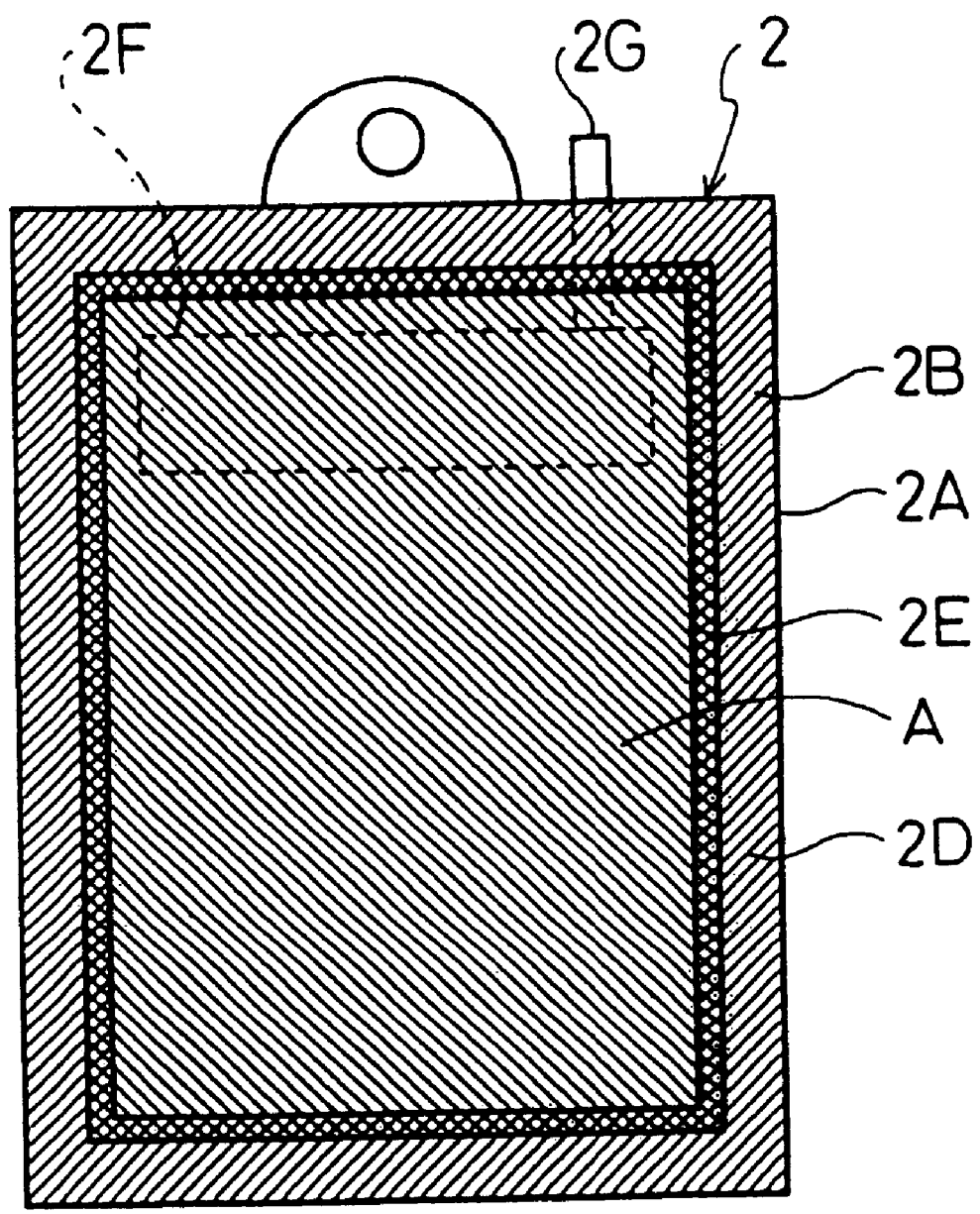
FIG. 2 is a front view of the above filtration membrane cartridge.
Figure 3:
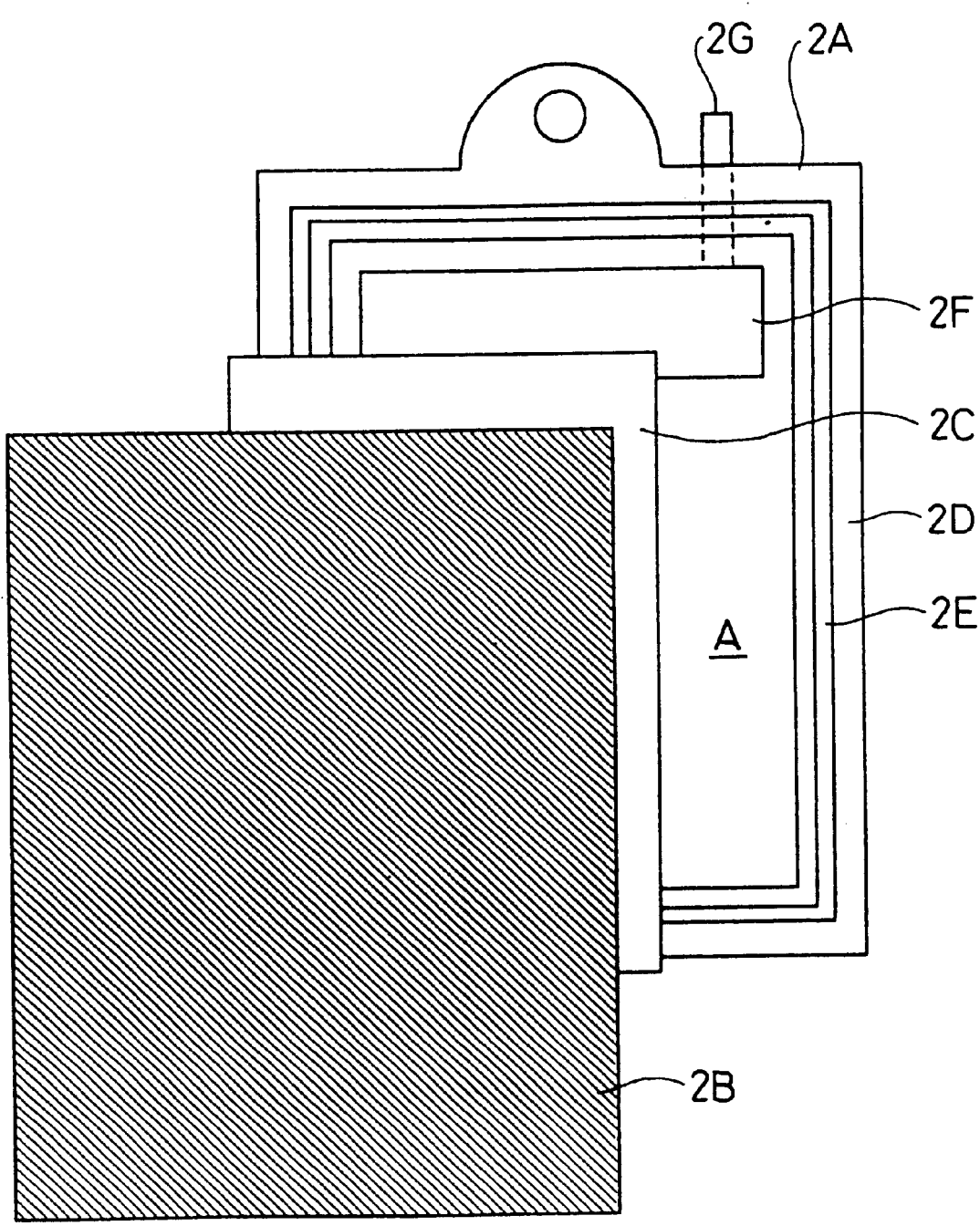
FIG. 3 is an exploded view illustrating the arrangement of the filtration membrane cartridge.

Referring to FIGS. 2 and 3, in a filtration membrane cartridge 2, a filtration membrane 2B of an organic flat membrane is disposed on both sides of a filter plate 2A made of ABS resin, a felt 2C is interposed between the filter plate 2A and the filtration membrane 2B, and the periphery of the filtration membrane 2B is secured to the filer plate 2A by welding with ultrasonic wave. The filtration membrane 2B is prepared by coating an organic macromolecular membrane material onto both sides of a non-woven fabric serving as a substrate.

Figure 4:
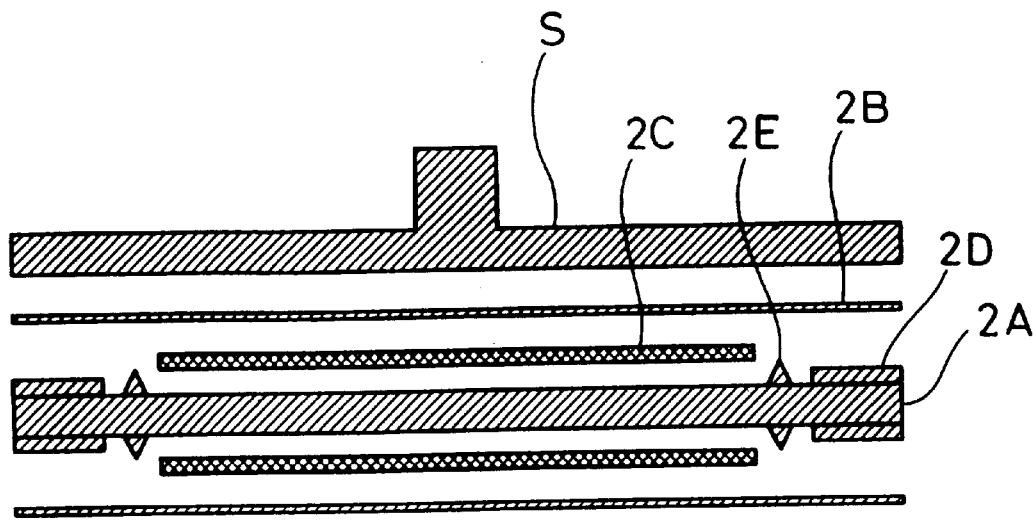
FIG. 4 is a schematic view illustrating one procedure in welding the filtration membrane cartridge.
Figure 5:
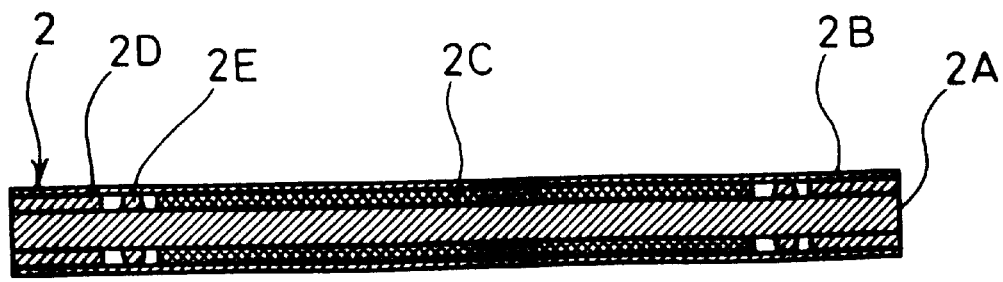
FIG. 5 is a cross section of the filtration membrane cartridge.

Manufacturing steps of a filtration membrane cartridge 2 is described by referring to FIGS. 3 to 5. A filter plate 2A has a welding auxiliary part 2D along its whole periphery, and a welded part 2E which is located at the inside of the welding auxiliary part 2D along the periphery of the part 2D. The welding auxiliary part 2D and welded part 2E are formed at a position higher than the surface of the filter plate 2A. A water collecting part 2F passes through both sides of the filter plate 2A, and a permeated liquid outlet 2G in communication with the water collecting part 2F is formed in an upper edge of the filter plate 2A.

A felt 2C is disposed at position surrounded by the welded part 2E on the surface of the filter plate 2A, and a filtration membrane 2B is then overlapped so as to cover the welding auxiliary part 2D and the welded part 2E.

In this state, ultrasonic wave is oscillated from an ultrasonic oscillator S to the welding auxiliary part 2D. With ultrasonic wave, the welding auxiliary part 2D is melted to weld between the part 2D and the periphery of the filtration membrane 2B, thereby the membrane 2B is tacked to the filter plate 2A. Thanks to the tack, when the filtration membrane 2B is pressed against the welded part 2E, the filtration membrane 2B lies flat without wrinkles in an effective filtration region A surrounded by the welded part 2E.

Subsequently, ultrasonic wave is oscillated from the ultrasonic oscillator S to the welded part 2E. With ultrasonic wave, the welded part 2E is melted to weld between the welded part 2E and the filtration membrane 2B. Thereby, the welded part 2E effects sealing between the effective filtration region A and the exterior. Both sides of the filter plate 2A are subjected to the foregoing steps. The prepared filtration membrane cartridge 2 ensures a predetermined space between the filter plate 2A and the filtration membrane 2B by the felt. This space forms a permeated liquid passage.

As shown in FIG. 1, each filtration membrane cartridge 2 is in communication with a collecting pipe 8 through a tube 7 connected to the permeated liquid outlet 2G. The collecting pipe 8 is in communication with a permeated liquid discharge pipe 9 that discharges a membrane-permeated liquid. A holding-down plate 10 prevents each filtration membrane cartridge 2 from floating.

When the above membrane separator 1 is used in activated sludge treatment facilities, the membrane separator 1 is immersed in a mixed liquid of activated sludge and raw water which is stored in an aeration tank (not shown), and aeration air is blown out from a diffuser 3. In this state, the organic and nitrogen in the raw water are treated with the activated sludge, while the mixed liquid is filtered through the filtration membrane cartridge 2 by using the head within the tank as a driving pressure (Alternatively, forced suction filtration can be effected by interposing a suction pump in the permeated liquid discharge pipe 9), and the liquid that has permeated the membrane surface of the filtration membrane cartridge 2 is then discharged to the outside of the tank as a treated water, through the permeated liquid discharge pipe 9.

At this time, the membrane surface of the filtration membrane cartridge 2 is cleaned by updraft which is caused by the bubbles of aeration air blown out from the diffuser 3 and their air lift action. This cleaning suppresses a reduction in separation function, preventing the membrane separator 1 from causing malfunction.

During the use of the filtration membrane cartridge 2, a cake layer composed of an organic, e.g., activated sludge, is attached to the membrane surface of the filtration membrane cartridge 2, or the pores of the membrane become clogged by organic contaminants, thus deteriorating its membrane separation function.

Figure 6:
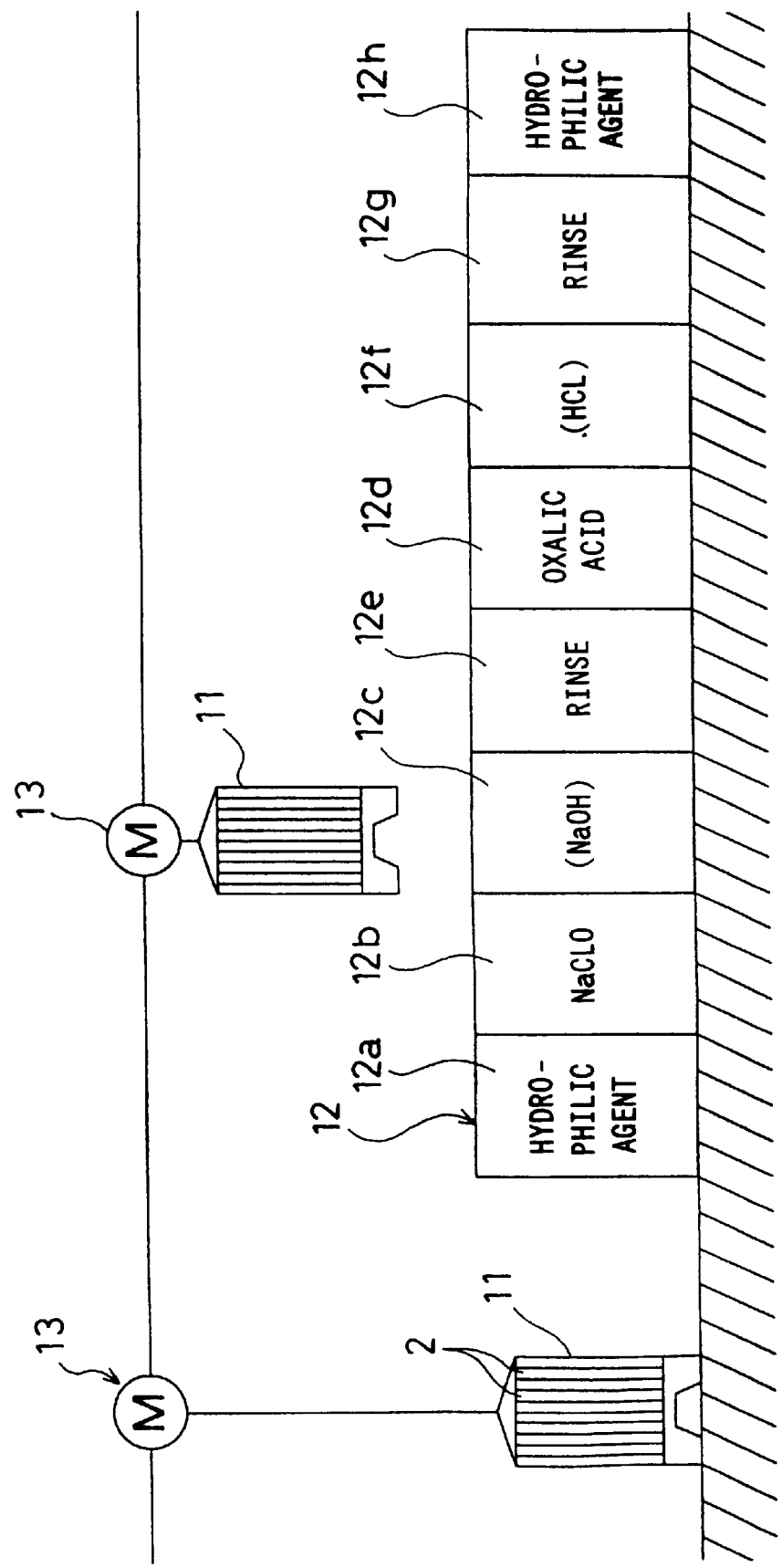
FIG. 6 is a schematic view illustrating an apparatus of regenerating a filtration membrane cartridge for activated sludge.
Figure 7:
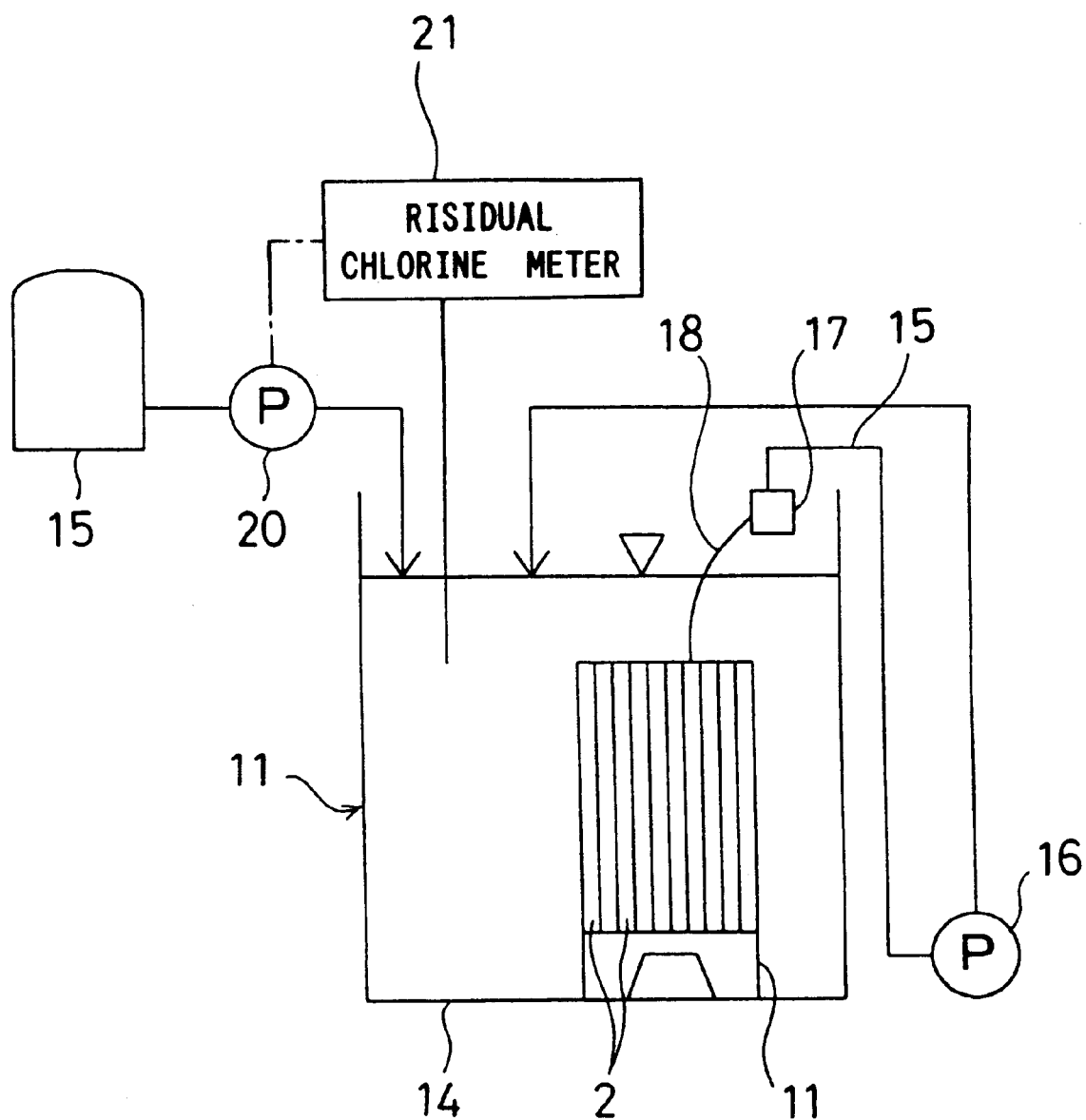
FIG. 7 is a schematic view showing details of the above apparatus.
Figure 8:
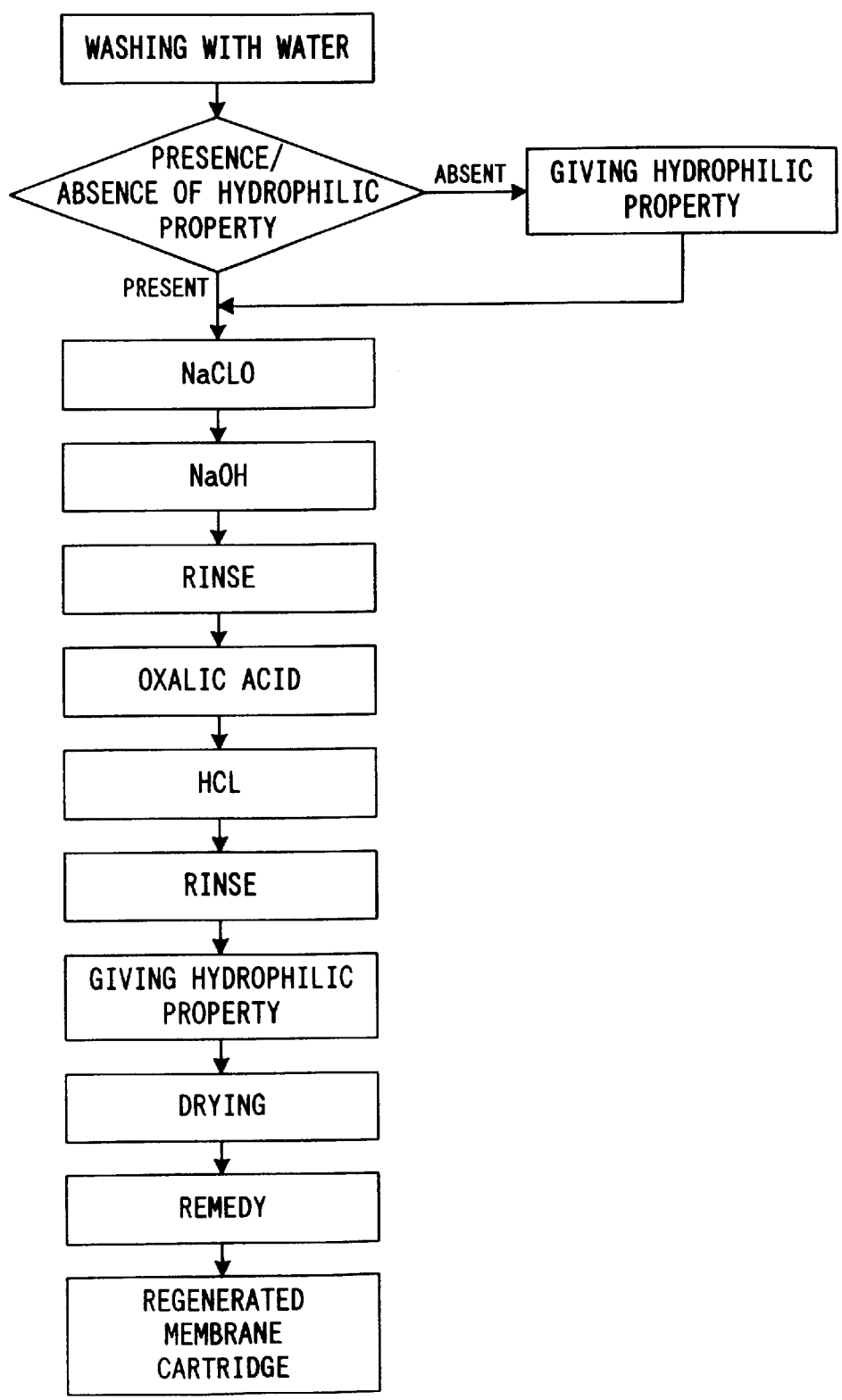
FIG. 8 is a flow chart illustrating the treating sequence in the above apparatus.

FIGS. 6 and 7 show an apparatus for cleaning and regenerating a filtration membrane cartridge 2 which has been used for solid-liquid separation of activated sludge. In FIGS. 6 and 7, a cleaning casing 11 opening top and bottom encases a plurality of filtration membrane cartridges 2 which are located parallel to each other in vertical direction.

A plurality of washing tanks 12a to 12h store different cleaning liquids, and a cleaning casing 11 encasing the filtration membrane cartridges 2 is immersed therein. Disposed above the washing tanks 12a to 12h is a conveying means 13 for transferring the washing casing 11 among the washing tanks 12a to 12h. The conveying means 13 has a hoist crane, for example.

A first washing tank 12a stores water or a hydrophilic agent, a second washing tank 12b stores a solution of 0.2–1.0% sodium hypochlorite, a third washing tank 12c stores a solution of 0.5–2.0% caustic soda, a fourth washing tank 12d stores a rinsing water, a fifth washing tank 12e stores a solution of oxalic acid, a sixth washing tank 12f stores a solution of hydrochloric acid, a seventh washing tank 12g stores a rinsing water, and an eighth washing tank 12h stores a solution of a hydrophilic agent.

The first washing tank 12a storing water or a hydrophilic agent, the third washing tank 12c storing caustic soda, and the sixth washing tank 12f storing the hydrochloric acid, are selectively provided according to the contamination condition of filtration membrane cartridges 2. That is, these washing tanks are not essential.

The washing tanks 12a to 12h have the same basic structure, and therefore, the washing tank 12b storing sodium hypochlorite is given as an example.

Referring to FIG. 7, a tank body 14 stores sodium hypochlorite as a cleaning liquid, and has a capacity of immersing a cleaning casing 11 encasing filtration membrane cartridges 2. A circulation line 15 has a suction pump 16 at its midway. The outlet side of the circulation line 15 is in communication with the interior of the tankbody 14, and its suction side is provided with a collecting pipe 17 having a plurality of tubes 18. The tubes 18 form a connecting part that provides a junction or clearance with respect to a permeated liquid takeoff port 2G of each filtration membrane cartridge 2.

A chemical tank 19 storing sodium hypochlorite is in communication with the tank body 14 through a supply pump 20, and the sensor section of a residual chlorine meter 21 that detects the concentration of sodium hypochlorite in the chemical tank 19 is immersed in the tank body 14. The residual chlorine meter 21 controls operation of the supply pump 20 so that the sodium hypochlorite concentration in the tank body 14 is automatically maintained within a predetermined range.

The first washing tank 12a may optionally have an agitator with propeller or a diffuser which serves as means for agitating the cleaning liquid in the tank. In the fourth washing tank 12d to perform rinsing, the outlet side of the suction pump 16 is not connected to the washing tank 12d but in communication with the next treating step.

Procedure in regenerating a filtration membrane cartridge 2 is given by referring to FIG. 6. Filtration membrane cartridges 2 which are drawn out of an aeration tank for activated sludge treatment are put in a cleaning casing 11 to allow for integral handling, and the cleaning casing 11 encasing a plurality of filtration membrane cartridges 2 is then conveyed by a conveying means 13.

Firstly, the cleaning casing 11 with the filtration membrane cartridges 2 is conveyed and immersed in a first washing tank 12a by the conveying means 13. In the first washing tank 12a, the activated sludge attached to a filtration membrane 2B is washed away with water or a hydrophilic agent, which is the pretreatment of the next step.

The cleaning casing 11 is then transferred and immersed in a second washing tank 12b by the conveying means 13. In the second washing tank 12b, organic contaminants clogging the pores of the filtration membrane 2B are decomposed and eliminated by oxidation of sodium hypochlorite.

The cleaning casing 11 is then transferred to and immersed in a third washing tank 12c by the conveying means 13. This step is effective for the case where filtration membrane cartridges 2 have been used in a drainage having a considerable aluminum composition. Specifically, a difficultly soluble alumina attached to the external surface and pores of the filtration membrane 2B is decomposed and removed by caustic soda.

The cleaning casing 11 is then transferred to and immersed in a fourth washing tank 12d by the conveying means 13. In the fourth washing tank 12d, the sodium hypochlorite and caustic soda attached to the filtration membrane 2B are washed away with a rinsing water. This treatment prevents the sodium hypochlorite and oxalic acid from reacting with each other to evolve chlorine gas in the next step.

The cleaning casing 11 is then transferred to and immersed in a fifth washing tank 12e by the conveying means 13. In the fifth washing tank 12e, ferrous materials attached to the filtration membrane 2B are washed away with oxalic acid.

The cleaning casing 11 is then transferred to and immersed in a sixth washing tank 12f by the conveying means 13. This step is effective for the case where Ca composition in drainage is attached to the filtration membrane cartridges 2 in the form of a difficultly soluble $CaCO_3$. Specifically, the $CaCO_3$ attached to the filtration membrane 2B is decomposed and removed by hydrochloric acid.

The cleaning casing 11 is then transferred to and immersed in a seventh washing tank 12g by the conveying means 13, to remove hydrochloric acid.

The cleaning casing 11 is then transferred to and immersed in an eighth washing tank 12h by the conveying means 13. In the eighth washing tank 12h, saccharide as a hydrophilic agent is applied to the filtration membrane 2B in preparation for dry lay-up.

Clearing actions in the washing tanks 12a to 12h is described by taking the washing tank 12b storing sodium hypochlorite, as an example. A suction pump 16 is operated setting filtration membrane cartridges 2 and a cleaning casing 11 in a tank body 14. In this state, sodium hypochlorite as a cleaning liquid is sucked through the filtration membrane cartridges 2, to remove the contaminant clogging the pores of the membrane, while subjecting the interior of the filtration membrane cartridges 2 to cleaning and disinfection.

The sodium hypochlorite that has permeated through the filtration membrane 2B is then passed in circulation to the tank body 14 through a permeated liquid path within the filtration membrane cartridges 2 and a circulation line 15, and the consumption of the sodium hypochlorite is supplied from a chemical tank 19 through a supply pump 20, so that the concentration of the sodium hypochlorite is maintained in a fixed range.

Since cleaning effect is improved by the suction and circulation of sodium hypochlorite, cleaning time ranges from about thirty minutes to one hour. On the other hand, it takes one to two hours to perform cleaning by immersing alone. In a washing tank 12d for rinsing, the discharge liquid from the suction pump 16 is not passed in circulation to the tank body 14 but introduced into the next step of treatment, and then discarded.

Thus, the separation function of filtration membrane cartridges can be positively regenerated by performing a combination of the steps of: cleaning with sodium hypochlorite; rinsing with water; cleaning with oxalic acid; giving hydrophilic property with a hydrophilic agent, alternatively, cleaning with water or a hydrophilic agent prior to the step of cleaning with sodium hypochlorite; cleaning with sodium hypochlorite, followed by cleaning with caustic soda; and cleaning with oxalic acid, followed by cleaning with hydrochloric acid.

Figure 9:
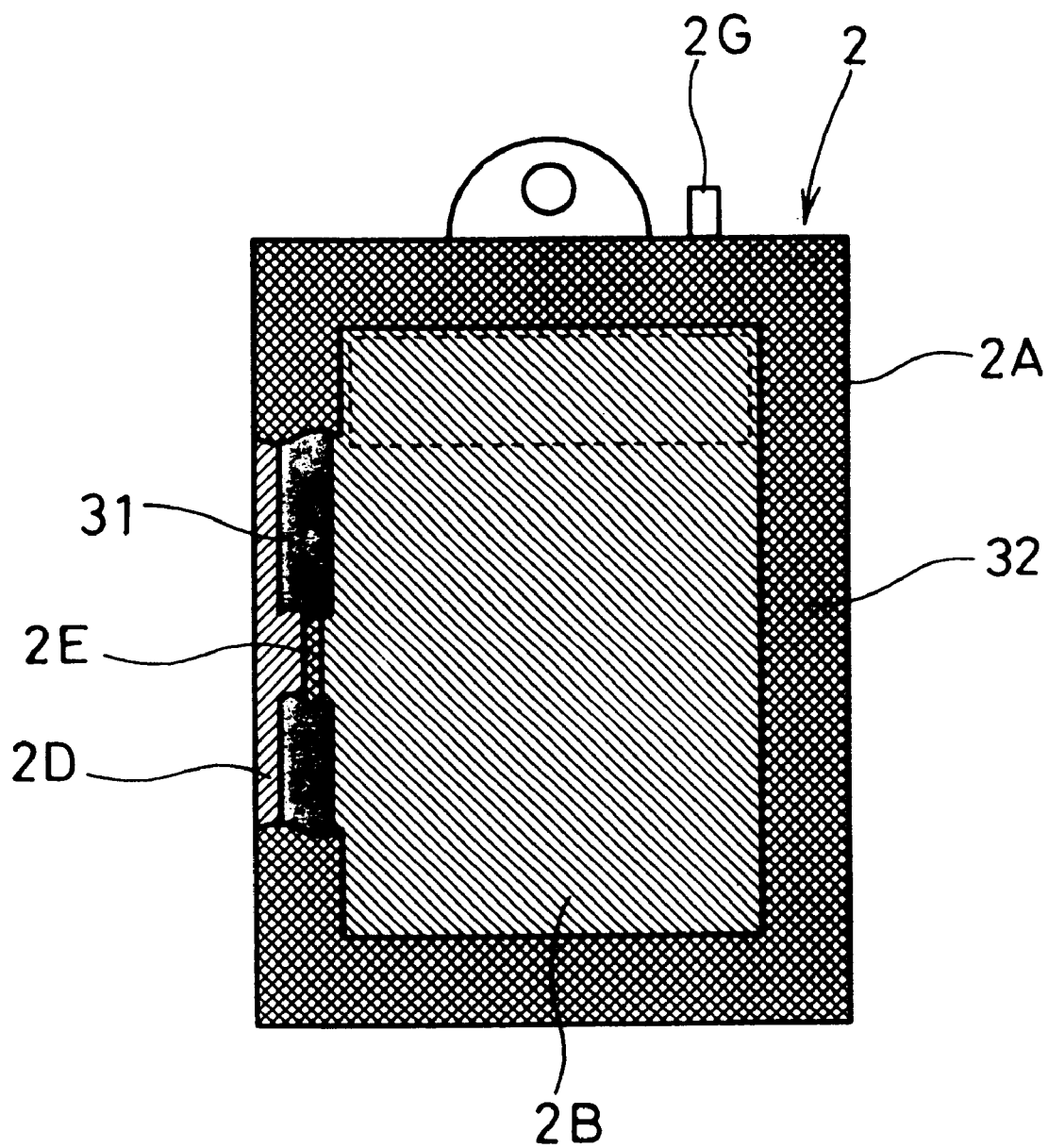
FIG. 9 is a schematic view illustrating the procedure in regenerating a filtration membrane cartridge for activated sludge according to other preferred embodiment.

Procedure in remedying a cleaned filtration membrane cartridge 2 is given. Referring to FIG. 9, a filtration membrane 2B or a material similar to the membrane 2B is shaped to be a tape of 5–10 mm in width, to obtain a reinforcing membrane material 31. The reinforcing membrane material 31 is disposed along the periphery of the filtration membrane 2B so as to cover a welded part 2E between the filtration membrane 2B and a filter plate 2A. An adhesive agent 32 is applied to the reinforcing membrane material 31 such that the filtration membrane 2B and the reinforcing membrane material 31 are integrally bonded to the filter plate 2A by the adhesive agent 32. If no damage to the welded part 2E of the filtration membrane 2B is observed, the adhesive agent 32 can be directly applied to the periphery of the filtration membrane 2B without providing the reinforcing membrane material 31.

As the adhesive agent 32, wet hardening soft adhesive agents are preferred, and soft polyurethane (esters) adhesive agents may be cited typically. The applied adhesive agent 32 permeates through the filtration membrane 2B to melt the membrane 2B, the reinforcing membrane material 31 and the filter plate 2A, thereby integrally bonding the three.

The wet hardening soft adhesive agent exhibits flexibility even after curing, and no force is exerted on the boundary with non-application part. Therefore, the filtration membrane 2B may cause no fatigue failure, permitting to improve its bonding strength more than that of a fresh one. In addition, remedy work is executable without drying the cleaned filtration membrane cartridge 2, and it can be returned into water before the adhesive agent dries completely. Hence, the filtration membrane cartridge 2 can be regenerated on-site with ease and at low cost, without returning it to the factory.

Figure 10:
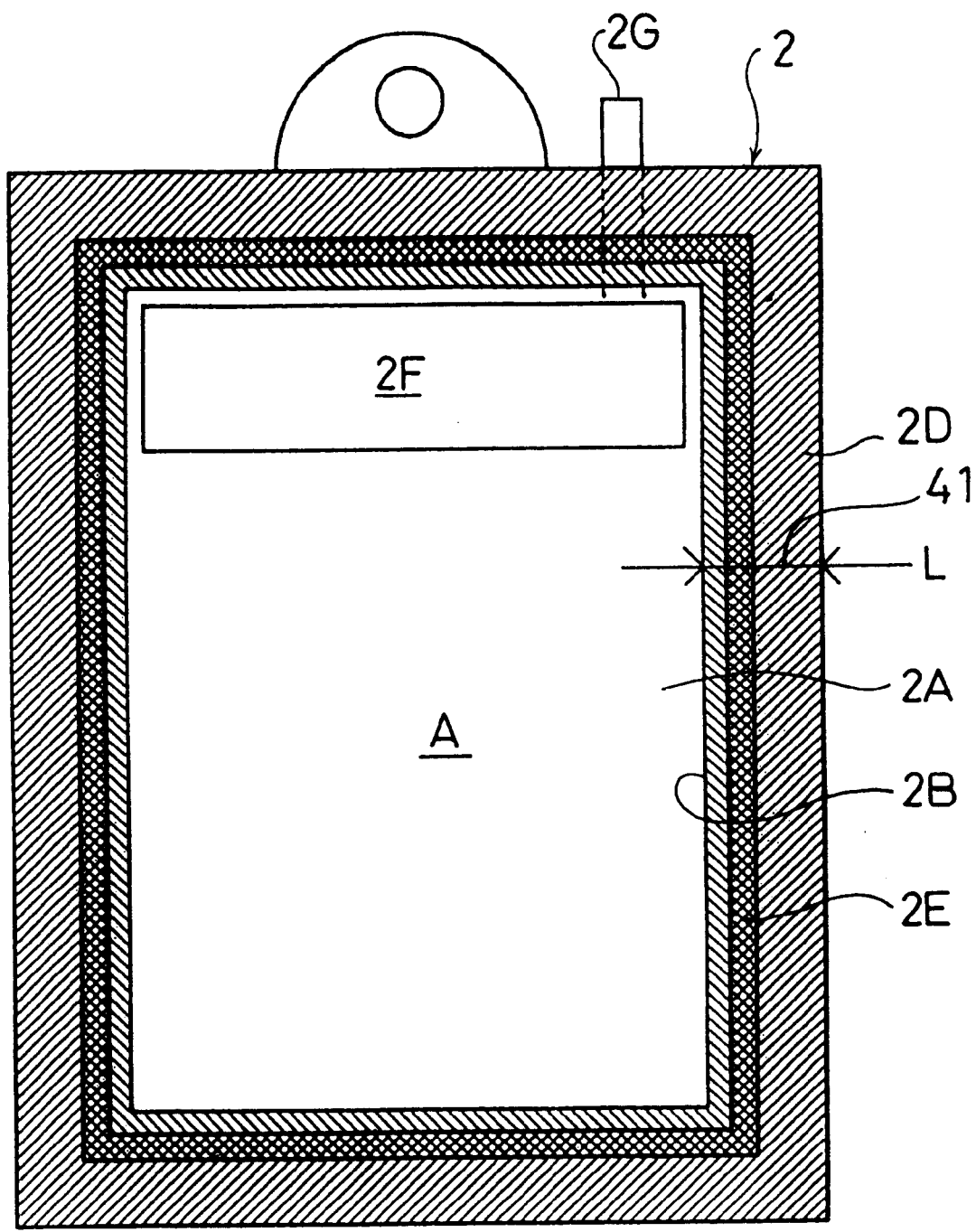
Fig. 10 is a schematic view illustrating another procedure in regenerating a filtration membrane cartridge for activated sludge.
Figure 11:
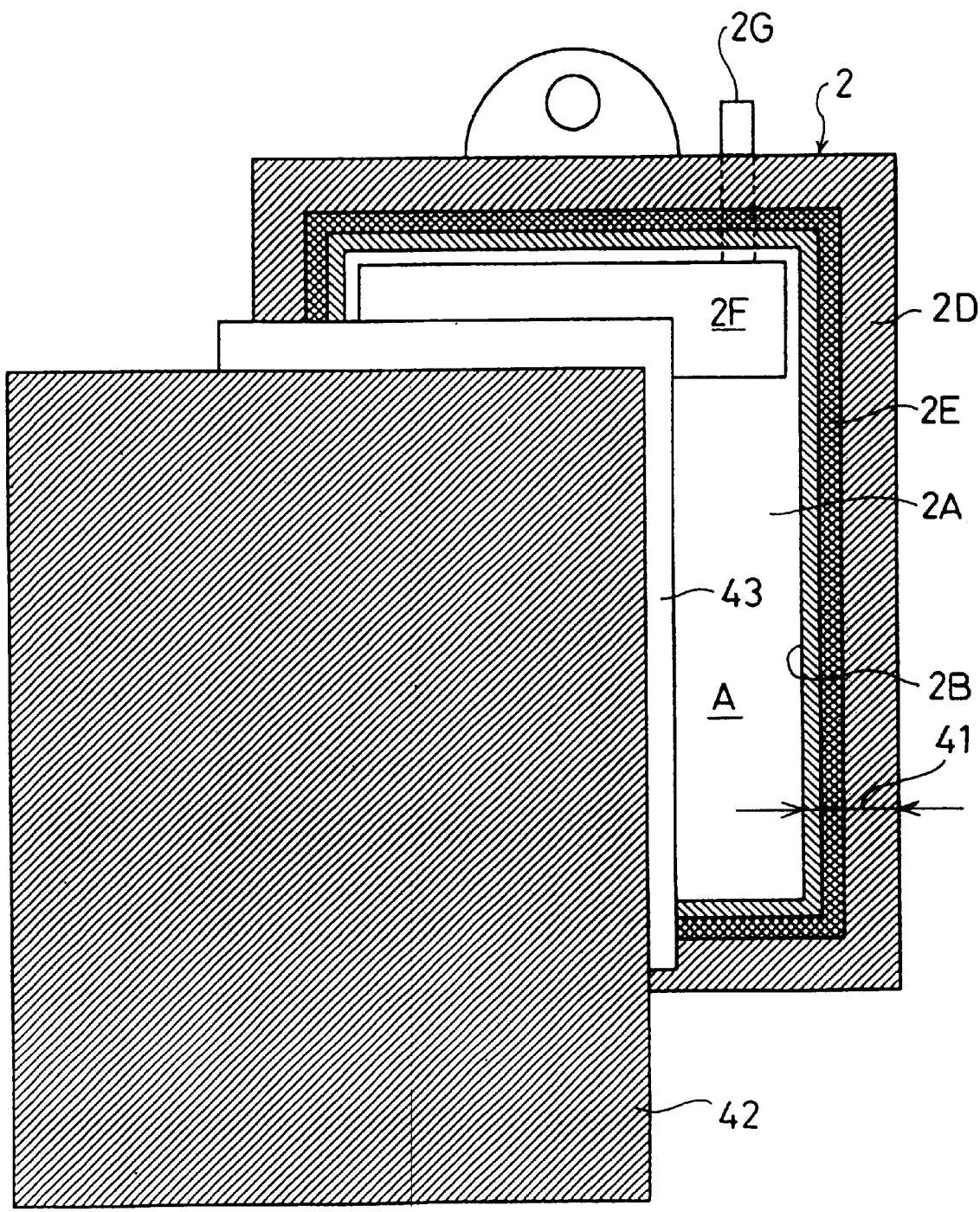
FIG. 11 is a schematic view illustrating the procedure in regenerating a filtration membrane cartridge for activated sludge according to other preferred embodiment.
Figure 12:
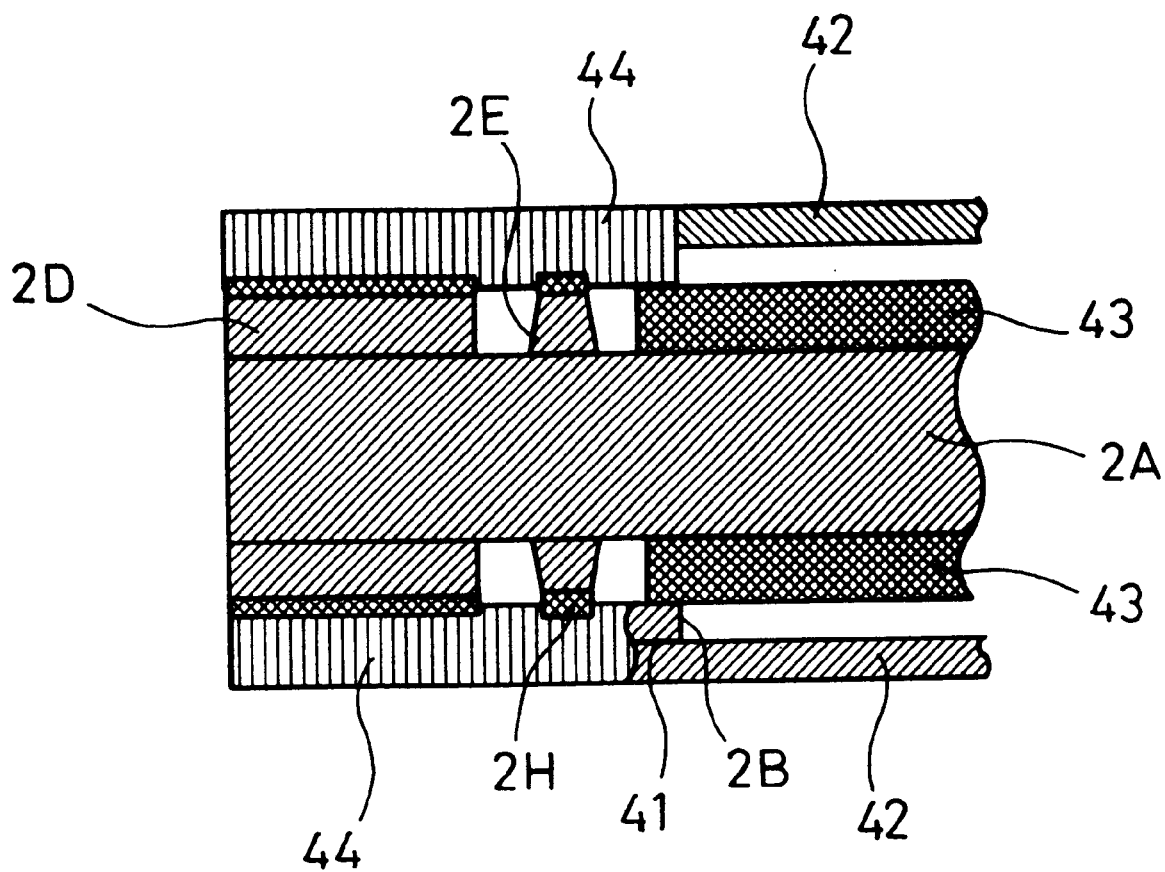
FIG. 12 is an enlarged cross section showing the junction structure of the above filtration membrane cartridge.

Another procedure in remedying a filtration membrane cartridge 2 is described by referring to FIGS. 10 to 12. In regenerating a filtration membrane cartridge 2 due to the damage to an effective filtration region A of a filtration membrane 2B, the membrane 2B is cut along the inside of the welded part 2E in a predetermined distance, to leave the filtration membrane 2B of a predetermined width L including the welded part 2E along the periphery of the filter plate 2A, as a bonding allowance 41.

The reason for this is that upon removal of the filtration membrane 2B, the surface of the filter plate 2A becomes rough at a welding auxiliary part 2D, making it difficult to directly bond a new filtration membrane 42 to the filter plate 2A. Accordingly, instead of directly bonding the new filtration membrane 42 to the filter plate 2A, the used filtration membrane 2B forming a bond on the welded part 2E is utilized as a bonding allowance 41.

Then, under the condition that the surface of the used filtration membrane 2B at the bonding allowance 41 is retained clean by cleaning, a new felt 43 is disposed in the region of the inside of the welded part 2E, and a new filtration membrane 42 is secured so as to cover the surface of the filter plate 2A. In this state, the periphery of the new filtration membrane 42 is brought into contact with the bonding allowance 41, and an adhesive agent is applied to the periphery of the new filtration membrane 42 which corresponds to the bonding allowance 41.

This adhesive agent maybe applied to the contact surface between the used filtration membrane 2B and the new filtration membrane 42. In this embodiment, however, a sufficient quantity of the adhesive agent is applied to the entire width of the bonding allowance 41, from the surface of the new filtration membrane 42. Here, one of soft polyurethane (esters) adhesive agents is employed. The adhesive agent permeates through the pores of both filtration membranes 2B, 42, and then solidified to become resin, thereby forming a layer of adhesive agent 44. The layer 44 seals the entire periphery of the filtration membranes 2B, 42.

Thus, the effective filtration region A in the new filtration membrane 42 can be sealed against the exterior by fixing the new filtration membrane 42 to the filter plate 2A through the used filtration membrane 2B. As a result, the sealing property between the filter plate 2A and the used filtration membrane 2B is ensured by the welded part 2E and its welded layer 2H, and the sealing property between the membranes 42 and the used filtration membrane 2B is ensured by the layer of adhesive agent 44. When the layer of adhesive agent 44 composed of a polyurethane adhesive is placed in water, it contains water and then exhibits flexibility, thus serving as a buffer to absorb the vibration of the new filtration membrane 42. This prevents breakage between the used filtration membrane 2B and new filtration membrane 42 in the bonding allowance 41. As described, the steps of cutting the used filtration membrane 2B and bonding the new filtration membrane 42 permit to regenerate the filtration membrane cartridge 2 with ease and at low cost.

Second Preferred Embodiment

Figure 13:
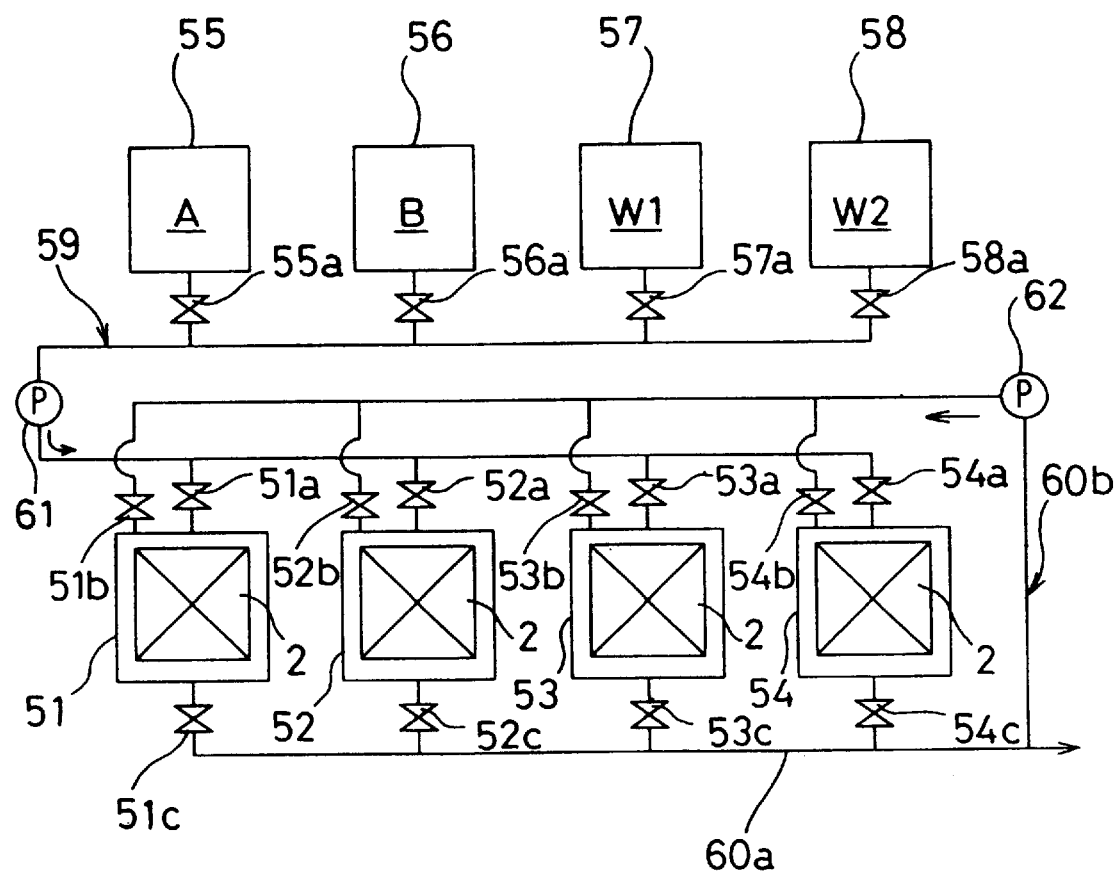
FIG. 13 is a schematic view illustrating the overall structure of a chemical cleaning apparatus according to other referred embodiment.

A second preferred embodiment of the invention is described hereafter. Referring to FIG. 13, a chemical cleaning apparatus according to the invention has a plurality of washing tanks 51 to 54, each of which encases a plurality of plate-like filtration membrane cartridges 2 as described at an adequate space; and a plurality of cleaning liquid tanks 55 to 58 which store different cleaning liquids, namely chemical liquids A, B, and rinsing waters WI, W2, respectively.

Disposed between the washing tanks 51 to 54 and the cleaning liquid tanks 55 to 58 is a cleaning liquid supply piping system 59. The piping system 59 has a line network to allow communication between the washing tanks 51 to 54 and the cleaning liquid tanks 55 to 58. The piping system enables communication between arbitrarily selected tanks of 51 to 54 ones and arbitrarily selected tanks of 55 to 58 tanks. The cleaning-liquid supply piping system 59 is in communication with the cleaning liquid tanks 51 to 54 through liquid supply stop valves 55a to 58a, respectively, and also in communication with the washing tanks 51 to 54 through inflow stop valves 51a to 54a, respectively.

The washing tanks 51 to 54 are in communication with a cleaning-liquid discharge piping system 60a through discharge stop valves 51c to 54c, respectively, and in communication with a cleaning liquid transfer piping system 60b through circulation stop valves 51b to 54b, respectively. The upstream of the cleaning liquid transfer piping system 60b is in communication with the cleaning liquid discharge piping system 60a. The cleaning liquid supply piping system 59 has a pumping installation 61, and the cleaning-liquid transfer piping system 60b has a pumping installation 62.

Figure 14:
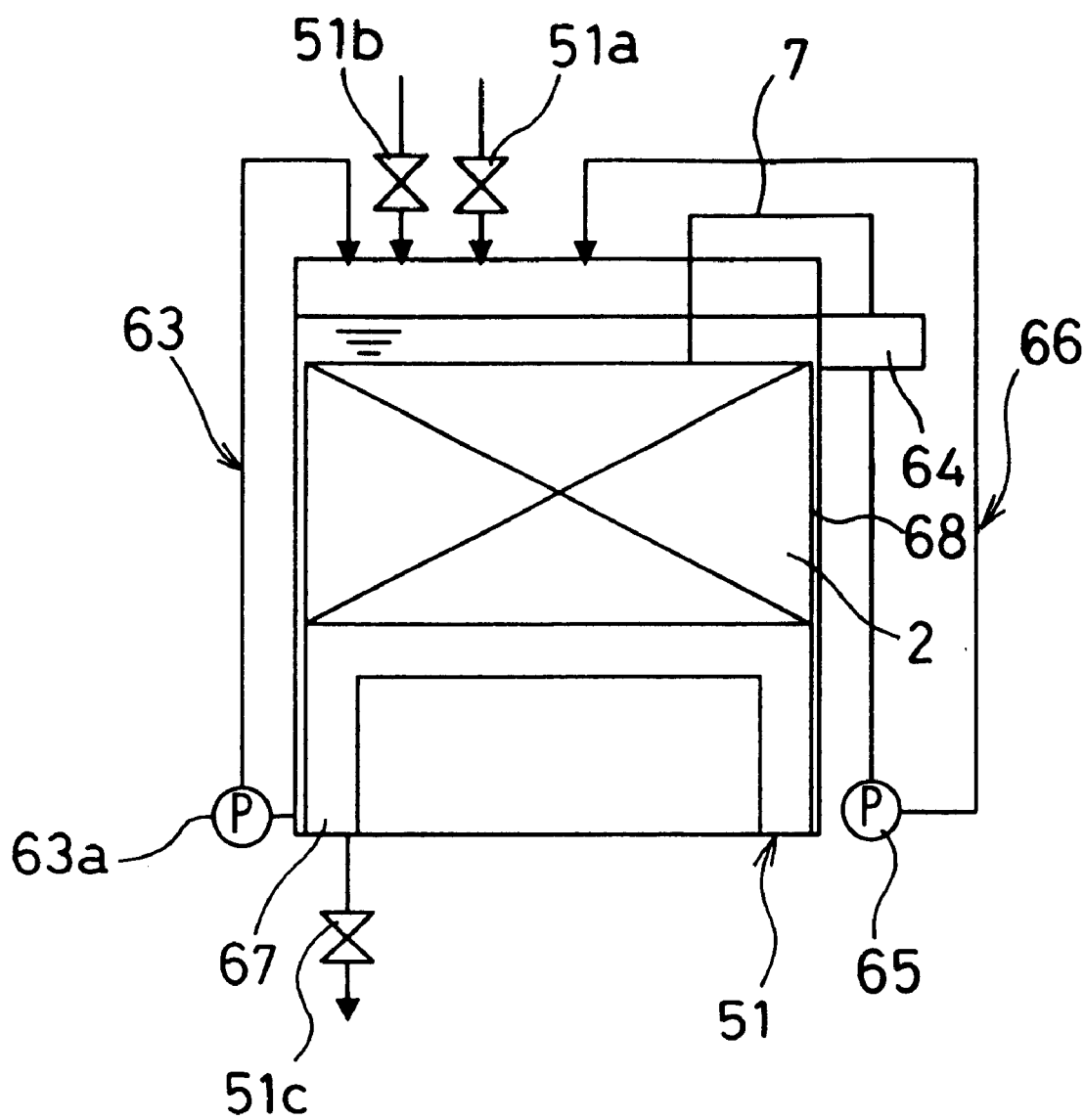
FIG. 14 is a schematic view illustrating the arrangement of a washing tank in the above chemical cleaning apparatus.

Referring to FIG. 14, each of the washing tanks 51 to 54 has a circulation system 63 as a cleaning liquid streaming means which circulates a cleaning liquid inside and outside the tank by a pump 63a; a collecting pipe 64 connectable to tubes 7 which are attached to their respective filtration membrane cartridges 2, disposed at one end of each tank; a circulation system 66 which circulates a cleaning liquid inside and outside the filtration membrane cartridges 2 by a suction pump 65; and a casing mount 67 opening at the top and side, disposed on the bottom of the tank.

Procedure in performing chemical-cleaning of filtration membrane cartridges 2 is given. After checking the degree of contamination and kind of contaminant in the membrane of each filtration membrane cartridge 2, a plurality of the filtration membrane cartridges 2 are collectively put in the washing tanks 51 to 54, respectively.

Figure 17:
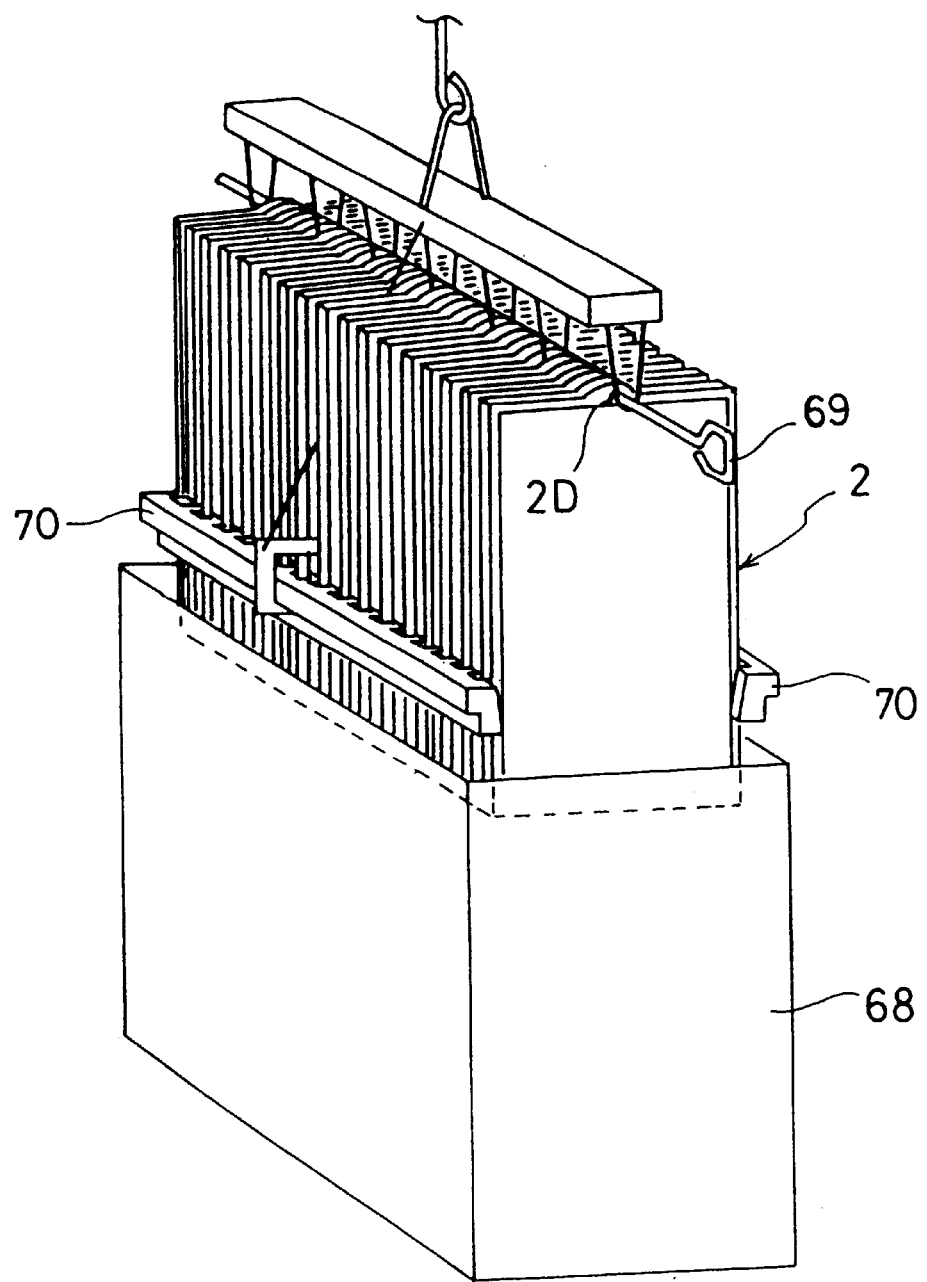
FIG. 17 is a perspective view of the state where a filtration membrane cartridge is removed from a membrane casing.

Referring to FIG. 17, the filtration membrane cartridges 2 encased in a membrane casing 5 are transferred to a membrane casing 68. This operation is effected by inserting a support rod 69 into a hoisting hole 2D of each filtration membrane cartridge 2 and integrally hoisting the filtration membrane cartridges 2 through the support rod 69 by a hoist crane. At this time, a jig 70 having slits of identical space intervals with those of the filtration membrane cartridges 2 is fitted on both sides of the hoisted filtration membrane cartridges 2. This enables to move the cartridges 2 while maintaining a predetermined space, and thus prevents damage to the filtration membranes.

Subsequently, the membrane casing 68 holding the aligned filtration membrane cartridges 2 (with the tubes 7 attached thereto) is conveyed to and placed on the casing mount 67 in any one of the washing tanks 51 to 54 by the hoist crane, and the tubes 7 of the filtration membrane cartridges 2 are connected with the collecting pipe 64.

In this state, there is selected optimum cleaning liquid to remove the contaminant of the filtration membrane cartridges 2, and a liquid supply stop valve 55a, 56b, 57a, or 58a of the cleaning liquid tanks 55, 56, 57, or 58 storing the optimum cleaning liquid is opened and an inflow stop valve 51a, 52a, 53a, or 54a of the washing tanks 51, 52, 53, or 54, to which the cleaning liquid will be supplied, is opened to introduce an adequate amount of the cleaning liquid into the washing tank 51, 52, 53, or 54 through the cleaning-liquid supply piping system 59, followed by cleaning.

For instance, chemical A in the cleaning liquid tank 55 is supplied to the washing tank 51 and filtration membrane cartridges 2 are immersed therein. Thereafter, the chemical A is circulated in circulating systems 63 and 66 to chemically decompose substances or slimes attached to the permeated liquid paths as well as the surface and inside of the filtration membranes of the filtration membrane cartridges 2. After cleaning, circulation in the circulation systems 63 and 66 is stopped.

Since the cleaning liquid in the washing tank 51 retains ability to clean upon termination of cleaning, it is reused in other washing tank 52, 53 or 54. To this end, the discharge stop valve of the washing tank 51 is opened and, for example, the circulation stop valve 52b of the washing tank 52 is opened, whereby the chemical A is transferred from the washing tank 51 to the washing tank 52 through a cleaning-liquid discharge piping system 60a and cleaning-liquid transfer piping system 60b.

Subsequently, a rinsing water W1 in a cleaning liquid tank 56 is supplied to the washing tank 51 through a cleaning-liquid supply piping system 59, to rinse the filtration membrane cartridges 2 with water. At this time, in the washing tank 52, 25 the filtration membrane cartridges 2 are cleaned by the chemical A and, upon termination of cleaning, the chemical A in the washing tank 52 is transferred to the washing tank 53 through the cleaning-liquid transfer piping system 60b. Thereafter, the rinsing water W1 in the washing tank 51 is transferred to the washing tank 52 through the piping system 60b.

Chemical B in a cleaning liquid tank 57 is supplied to the washing tank 51 through the cleaning-liquid supply piping system 59 to clean the filtration membrane cartridges 2. At this time, in the washing tank 52, the filtration membrane cartridges 2 are rinsed with the rinsing water W1. In the washing tank 53, the filtration membrane cartridges 2 are cleaned by the chemical A and, upon termination of cleaning, the chemical A in the washing tank 53 is transferred to the washing tank 54 through the cleaning-liquid transfer piping system 60b.

The rinsing water W1 in the washing tank 52 is then transferred to the washing tank 53 through the cleaning-liquid transfer piping system 60b, and the chemical B in the washing tank 51 is then transferred to the washing tank 52 through the piping system 60b.

Subsequently, a rinsing water W2 in the cleaning liquid tank 58 is supplied to the washing tank 51 through the cleaning-liquid supply piping system 59 to rinse the filtration membrane cartridges 2 with water. At this time, in the washing tank 52 the cartridges 2 are cleaned by the chemical B. In the washing tank 53, the cartridges 2 are rinsed with the rinsing water W1. In the washing tank 54, the cartridges 2 are cleaned by the chemical A and, upon termination of cleaning, the chemical A in the washing tank 54 is transferred to the outside of the apparatus through the cleaning-liquid transfer piping system 60b.

Then, the rinsing water W1 in the washing tank 53 is transferred to the washing tank 54 through the piping system 60b, the chemical B in the washing tank 52 is transferred to the washing tank 53 through the transfer piping system 60b, and the rinsing water W2 in the washing tank 51 is transferred to the washing tank 52 through the transfer piping system 60b.

In accordance with the foregoing procedure, the cleaning liquid is utilized in turn to perform cleaning in the washing tanks 51 to 54. After cleaning, connections between the tubes 7 and the collecting pipe 64 in the filtration membrane cartridges 2 are released, and the membrane casing 68 is taken out of the tank and conveyed accordingly by the hoist crane.

As described, once the filtration membrane cartridges 2 is set in the washing tanks 51 to 54, they are not transferred from the tank to the tank until a series of cleaning is terminated, thus causing neither falling of drops nor splashing of chemicals or the like. Prior to cleaning, the kind of chemical is suitably selected depending upon the kind and degree of contaminant of the membranes. When the filtration membrane cartridges 2 of all washing tanks 51 to 54 are cleaned with two kinds of chemicals (e.g., the solutions of sodium hypochlorite and of oxalic acid are employed as chemical A and chemical B, respectively), it is efficient to transfer the chemicals through four washing tanks 51 to 54 in series.

In an apparatus having the same arrangement, cleaning operations of different procedures can be effected by the respective washing tanks 51 to 54. For instance, chemical A and rinsing water W1 can be supplied in turn to the washing tanks 51 and 52, and chemical A, rinsing water W1, chemical B and rinsing water W2 can be supplied in turn to the washing tanks 53 and 54.

When one kind of chemical is used, it may be arranged that two washing tanks 51 and 52 or two washing tanks 53 and 54 are used and chemical and rinsing water are transferred in turn, or that four washing tanks 51 to 54 are used and chemical and rinsing water are transferred successively in two systems.

Alternatively, chemical and rinsing water may be returned to washing tanks 51 to 54 for repeated use. In this case, whenever it is used, the chemical concentration becomes low and the chemical concentration in the rinsing water becomes high. It is therefore required to perform concentration adjustment or disposal in an appropriate manner.

Figure 15:
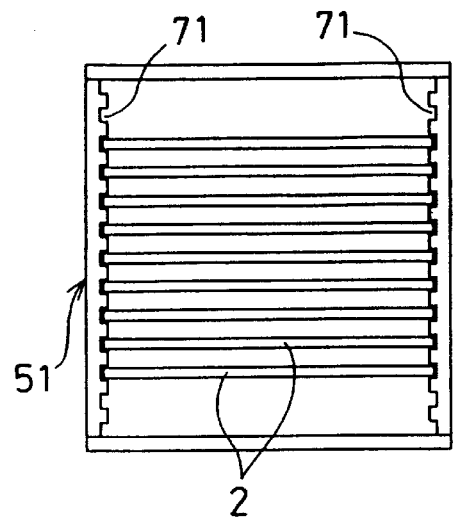
FIG. 15 is a plane view of another washing tank.
Figure 16:
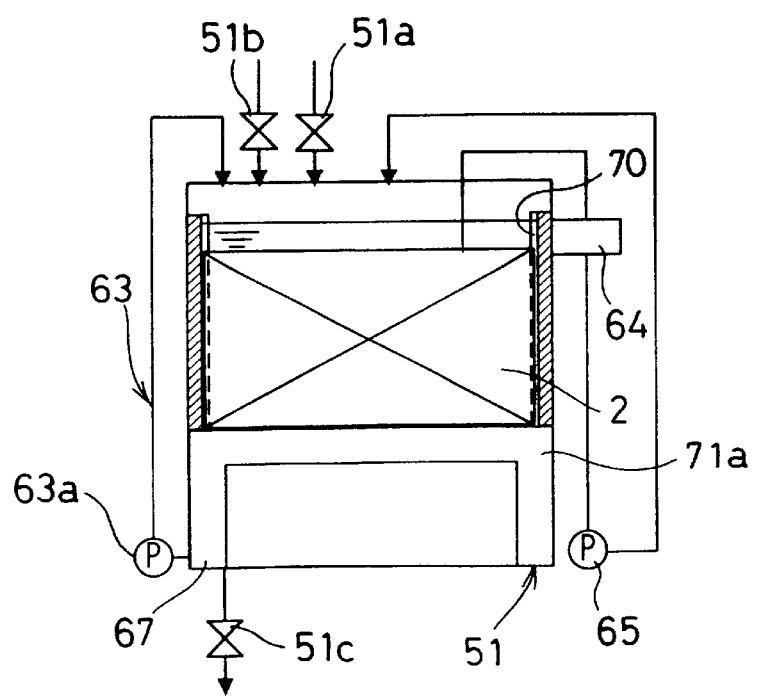
FIG. 16 is a longitudinal cross section of the above washing tank.

Referring to FIGS. 15 and 16, conveyed filtration membrane cartridges 2 can be directly aligned in suitable sheets in washing tanks 51 to 54 only by providing slits 71 for holding filtration membrane cartridges 2 and installing mounts 71a for receiving them, in the washing tanks 51 to 54.

What is claimed is:

1. A method of regenerating a filtration membrane cartridge for activated sludge, said filtration membrane cartridge being used for solid-liquid separation of activated sludge and prepared by covering the surface of a filter plate with a filtration membrane made of an organic flat membrane, comprising subjecting said filtration membrane cartridge to the steps in the order named: cleaning with sodium hypochlorite soda; rinsing with water; cleaning with oxalic acid; and giving hydrophilic property with a hydrophilic agent.

2. A method of regenerating a filtration membrane cartridge for activated sludge as defined in claim 1 wherein said filtration membrane cartridge is subjected to cleaning with water or a hydrophilic agent prior to cleaning with said sodium hypochlorite soda.

3. A method of regenerating a filtration membrane cartridge for activated sludge as defined in claim 1 wherein said filtration membrane cartridge is subjected to cleaning with caustic soda after cleaning with said sodium hypochlorite soda and before rinsing with said water.

4. A method of regenerating a filtration membrane cartridge for activated sludge as defined in claim 1 wherein said filtration membrane cartridge is subjected to cleaning with hydrochloric acid after cleaning with said oxalic acid and before giving said hydrophilic property with said hydrophilic agent.

* * * * *